C. Roberts,
Harvester Rake.
No. 10904.  Patented May 16 1854.
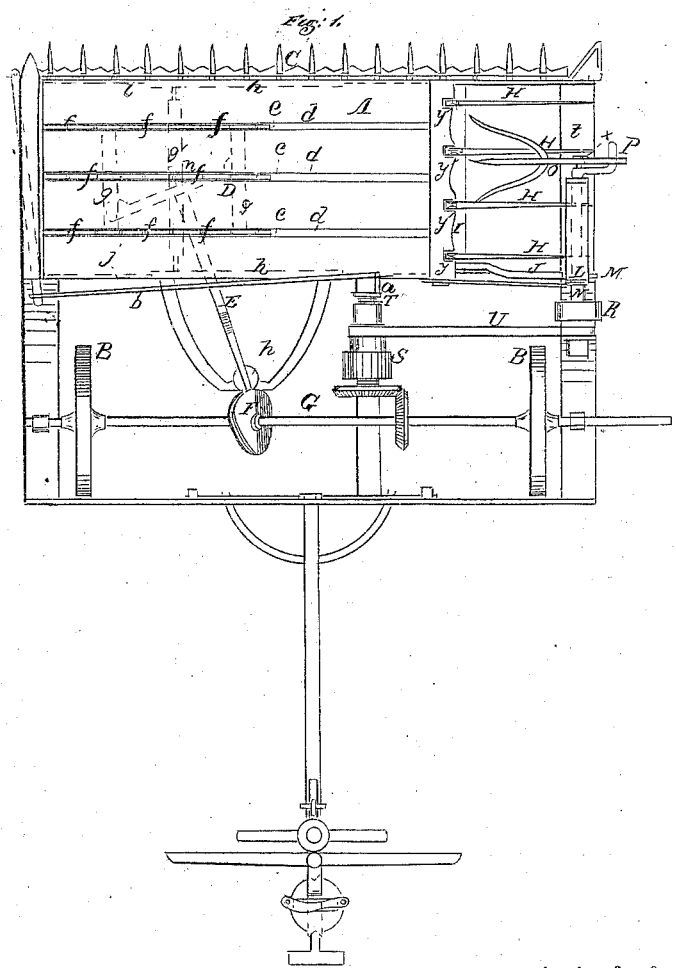
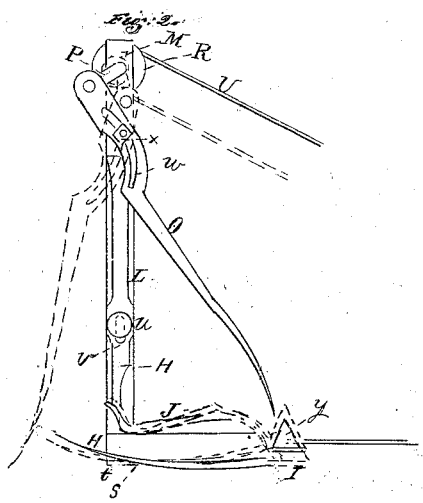
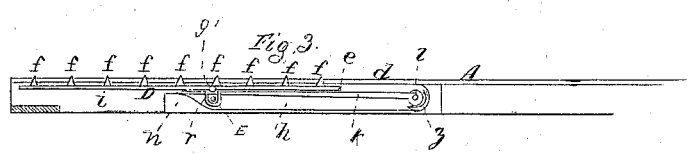
Patent Agency
Scientific American Office
123 Fulton St. N.Y.

UNITED STATES PATENT OFFICE.

CYRUS ROBERTS, OF BELLEVILLE, ILLINOIS.

IMPROVEMENT IN HARVESTER-RAKES.

Specification forming part of Letters Patent No. 10,904, dated May 16, 1854.

*To all whom it may concern:*

Be it known that I, CYRUS ROBERTS, of Belleville, in the county of St. Clair and State of Illinois, have invented a new and improved raking attachment to be applied to harvesting-machines for the purpose of raking and throwing the cut grain from the platform, said attachment being also capable of being applied to thrashing-machines, corn-shellers, &c., for the purpose of feeding the grain and corn to the same; and I do hereby declare that the following is a full, clear, and exact description of the construction and operation of the same, reference being had to the annexed drawings, making a part of this specification, in which—

Figure 1 is a plan or top view of a harvesting-machine with my improvement applied to it. Fig. 2 is a side view of the fork and fingers, showing the operation of the same, whereby the cut grain is thrown from the fingers in suitable quantities to form sheaves. Fig. 3 is a view of the inner side of the front cross-piece of the platform. This view shows the manner in which the rake is elevated and depressed.

Similar letters of reference indicate corresponding parts in the several figures.

This invention relates to a new and improved raking attachment to be applied to harvesting-machines for the purpose of raking and throwing the cut grain from off the platform in suitable quantities to form sheaves, said attachment being also capable of being applied to thrashing-machines, corn-shellers, &c., for the purpose of feeding the grain and corn to the same.

The nature of my invention consists in the employment or use of a series of fingers placed at one side of the platform and operating in a peculiar manner, in combination with a fork, also operating in a peculiar manner, for the purpose of removing the cut grain from the platform.

To enable others skilled in the art to make and use my invention, I will proceed to describe its construction and operation.

A represents the platform of a harvesting-machine, supported by two wheels, B B, said platform having the ordinary reciprocating sickle, C, at it front end, to which motion is communicated by means of the crank $a$, connecting-rod $b$, and lever $c$, as shown in Fig. 1. The platform A has a number of longitudinal slots, $d$, extending its whole length, as shown in Fig. 1, and underneath the platform is the rake D, (seen in Figs. 1 and 3,) which rake is formed of a number of parallel bars, $e$, having teeth, $f$, on their upper surfaces, a bar, $e$, being in line with a slot, $d$. (See Fig. 1.) The parallel bars are connected together by cross-bars $g\ g\ g'$, each end of the center cross-bar, $g'$, projecting some distance beyond the two outer bars, $e$, and fitting in longitudinal grooves $h\ h$, one groove being in the inner side of the back cross-piece, $j$, of the platform, as seen in dotted lines in Fig. 1. The grooves $h\ h$ are each divided longitudinally by a movable bar, $k$. One end of each bar is secured by a pivot, $l$, to its cross-piece, while the opposite end rests upon the upper end of an inclined ledge, $m$. (See Fig. 3.)

E is a lever, the inner end of which fits in a loop or eye, $n$, (see Figs. 1 and 3,) on the under side of the rake D. The fulcrum of the lever is at $p$. (See Fig. 1.) The outer end of the lever E fits in a grooved cone, F, in the axle G of the wheels B B.

H H H H, Figs. 1 and 2, are fingers, somewhat curved and attached at their back ends or bases to a bar, I. Each finger has a small projection, $s$, on its under surface, the projection fitting in holes in the side piece, $t$, of the frame of the machine. The bar I is not attached to the frame. It merely secures the fingers in their proper position, or at the desired distances apart. At the base of each finger H there is a triangular projection, $y$. (Shown in Figs. 1 and 2.)

J, Figs. 1 and 2, is a curved lever, one end of which is attached to one end of the bar I, and the opposite end bears against the lower end of a rod or bar, K, at the side of an upright, L, the rod or bar K being secured against the upright by a screw, $u$, which passes through a slot, $v$, in the bar K, and into the upright. (See Fig. 2.) The upper end of the rod or bar K bears against an eccentric, M, which is on a horizontal shaft, N, at the upper end of the upright L. (See dotted lines, Fig. 2.)

O is a fork provided with a curved slot, $w$, in which a pin, or the end of a bar, $x$, attached to the upright L, fits. The upper end of the fork O is connected to a crank, P, at one end of the shaft N. At the opposite end of the shaft N there is a cone of pulleys, R.

S is a cone of pulleys on a shaft, T, to which the crank $a$ is attached, and U is a belt by which motion is communicated to the pulleys R from the pulleys S. (See Fig. 1.)

Operation: As the machine is drawn along, motion is given the sickle c by means of the crank a, connecting-rod b, and lever c. The grain, as it is cut by the sickle C, falls upon the platform A, and the rake D is moved along by the cam F and lever E toward the fingers H, the ends of the cross-piece g', moving upon the bar k, as seen in Fig. 3, the teeth f of the rake being elevated above the surface of the platform A. The grain upon the platform is carried or moved by the rake D toward the fingers H, and is brought or pressed against the projections y, which straighten the grain, so that it will lie transversely on the platform. The rake is then depressed, the teeth f falling below the surface of the platform, in consequence of the ends of the cross-bar g' passing down the curved passages z at the ends of the bar k. (See Fig. 3.) The rake then returns backward underneath the bar k, the ends of the cross-bar g' ascending the inclined ledge n and raising the end of the movable bar k. The rake being again elevated moves toward the fingers H, as before. The bases of the fingers are depressed by means of the eccentric M, rod K, and lever J, so that the grain previously raked to the side of the platform will be forced upon the fingers H over the tops of the projections y. As the rake D again returns from the fingers H, the fork O, operated by the crank P, throws the grain from the fingers upon the ground, the fork passing quickly over the fingers, owing to the short leverage the crank has upon the fork at that time. This will be understood by referring to Fig. 2, the red lines showing the position of the fork when it has just passed beyond the ends of the fingers. The crank P raises the fork and throws it back toward the bases of the fingers, and this motion is comparatively slow as the leverage is longer, the slot w working on the pin or end of the bar x; but when the fork is moved off from the fingers it goes with a rapid motion, in consequence of the short leverage obtained by the crank forcing the fork downward. The bases of the fingers and projections y are depressed as the fork is moved upward and backward, in order that the points of the fingers may be elevated to prevent the grain being shoved off of them at an improper time; and the base of the fingers and projections y are elevated and the points of the fingers depressed when the fork is moved outward from the fingers, in order to allow the grain to pass readily off of the fingers.

By means of the rake D, operated as described, I am enabled to place the platform and sickle quite low, so that the grain may be cut close to the ground, no crank being required.

By means of the fork O and fingers H, operated as described, the grain may be thrown rapidly from the fingers, so that it will fall in a compact manner upon the ground.

The rake, fork, and fingers may be advantageously employed in feeding grain to thrashing-machines, &c., the operation being precisely the same as when applied to a harvesting-machine.

Having thus described my invention, what I claim as new, and desire to secure by Letters Patent, is—

The fingers H, arranged as described, and operated by means of the eccentric M, rod K, and lever J, in combination with the fork O, constructed and arranged as herein shown—viz., with a curved slot, w, through it, in which the pin or arm x fits—and operated by the crank P, for the purpose of removing the cut grain from the platform, as described in the body of the specification.

CYRUS ROBERTS.

Witnesses:
   THEOD. I. KROSS,
   JOHN RITTENHOUSE.